United States Patent

Imanaka

[11] Patent Number: 5,813,915
[45] Date of Patent: Sep. 29, 1998

[54] DAMPER DISK ASSEMBLY HAVING MULTIPLE STAGE DAMPENING CHARACTERISTICS

[75] Inventor: Hideyuki Imanaka, Moriguchi, Japan

[73] Assignee: Exedy Corporation, Osaka, Japan

[21] Appl. No.: 805,396

[22] Filed: Feb. 24, 1997

[30] Foreign Application Priority Data

Mar. 8, 1996 [JP] Japan ..................... 8-051551

[51] Int. Cl.⁶ ..................... F16D 3/14
[52] U.S. Cl. .................... 464/68; 192/213.22; 192/214.1
[58] Field of Search ............ 464/66, 68; 192/213.2, 192/213.12, 213.21, 213.22, 213.31, 214.1

[56] References Cited

U.S. PATENT DOCUMENTS

| | | | |
|---|---|---|---|
| 4,234,068 | 11/1980 | Le Brise | 192/214.1 |
| 4,485,907 | 12/1984 | Nishimura | 464/68 |
| 4,494,642 | 1/1985 | Hashimoto | 192/213.22 |
| 4,618,048 | 10/1986 | Kobayashi | 464/68 |
| 4,787,877 | 11/1988 | Nagao et al. | 464/68 |
| 4,848,552 | 7/1989 | Nishimura et al. | 192/214.1 |
| 5,163,875 | 11/1992 | Takeuchi | 192/213.22 |
| 5,609,526 | 3/1997 | Kitayama et al. | 464/68 |

*Primary Examiner*—Eileen A. Dunn
*Attorney, Agent, or Firm*—Shinjyu An Intellectual Property Firm

[57] ABSTRACT

A first frictional resistance generating mechanism 10 includes a first friction washer 51, a second friction washer 52 and a conical spring 53. The first friction washer 51 includes a high friction coefficient member 71 in contact with a side surface of a flange 4b and a core plate 72 fixed thereto, and has second apertures 51a through which stop pins 41 fixed to the first and second side plates 5 and 6 extend. The second friction washer 52 has a low friction coefficient member 73 in contact with the core plate 72, and is relatively nonrotatably coupled to the stop pins 41. The conical spring 53 biases the first and second friction washers 51 and 52 toward the flange 4b.

6 Claims, 5 Drawing Sheets

DAMPER DISK ASSEMBLY HAVING MULTIPLE STAGE DAMPENING CHARACTERISTICS

BACKGROUND OF THE INVENTION

A. Field of the Invention

The present invention relates to a damper disk assembly, and in particular to a damper disk assembly having two stages of vibration dampening characteristics.

B. Description of the Background Art

A clutch disk assembly used in a clutch of an automotive vehicle generally includes a circular or annular input plate, an output have having a radial flange, and elastic members arranged between the input plate and the flange for elastically restricting relative rotation between them. Such a clutch disk assembly has also been used that sub-plates are arranged at opposite sides of the flange. In this assembly, a pair of input plates are coupled to the sub-plates by elastic members, and the sub-plates are coupled to the hub by elastic members having a low rigidity so that the assembly provides dampening characteristics having two stages. In this damper disk assembly, it is possible to increase a relative torsion angle between the input plates and the hub, and it is also possible to provide torsion characteristics having two stages exhibiting low and high rigidities, respectively.

The clutch disk assembly also includes a frictional resistance generating mechanism for generating a hysteresis torque when the paired input plate rotate relatively to the output plate. When the torsion angle between them is small, the input plates and the sub-plates rotate together and relatively to the output hub. In this operation, the elastic members of a low rigidity are compressed, and the frictional resistance generating mechanism generates a low hysteresis torque. When the torsion angle increases, the sub-plates and the output hub rotate together, and relative rotation occurs between the output hub and the input plates. In this operation, the elastic members of a high rigidity are compressed, and the frictional resistance generating mechanism generates a high hysteresis torque.

In the conventional damper disk assembly, when a fine torsional vibration, which is caused by fluctuations in rotation of an engine during idling, is transmitted to the clutch disk assembly, a periodical or cyclic relative rotation occurs principally in a first torsion angle range. In order to absorb the torsional vibration during idling, it is preferable that the characteristics exhibit a low rigidity and a low hysteresis torque. If the hysteresis torque is set low, however, the torsion angle increases and enters a second stage when a torque fluctuates to a large extent, the characteristics of the damper disk assembly are such that an excessively rapid change results in jumping or jerking response. This jumping or jerking causes noises to propagate from gear teeth in an connected transmission.

SUMMARY OF THE INVENTION

Accordingly, it is one object of the present invention to lower a hysteresis torque in a first stage to prevent noises during idling while suppressing jumping or jerking at a transition point between first and second stages of torsion characteristics.

According to a first aspect of the invention, a damper disk assembly includes a pair of circular input plates, a hub, a pair of sub-plates, a coupling member, a first elastic member, a second elastic member, a first frictional resistance generating mechanism and a second frictional resistance generating mechanism. The paired circular input plates have central apertures and are fixed together. The hub has a boss arranged in the central apertures, and a flange provided with a first aperture and arranged between the paired circular input plates. The paired sub-plates are arranged between the paired circular input plates and at opposite sides of the flange. The coupling member couples the paired sub-plates together, and circumferentially movably extends through the first aperture. The first elastic member circumferentially couples the paired sub-plates to the flange. The second elastic member circumferentially couples the paired circular input plates to the sub-plates. The second elastic member has a higher rigidity than the first elastic member. The first frictional resistance generating mechanism includes a first friction washer, a second friction washer and a biasing member. The first friction washer has a high friction coefficient member in contact with a side surface of the flange, and a plate member fixed to the same, and has a second aperture through which the coupling member circumferentially movably extends. The second friction washer has a low friction coefficient member in contact with the plate member, and is relatively non-rotatably coupled to the coupling member. The biasing member biases the first and second friction washers toward the flange. The second frictional resistance generating mechanism generates a larger frictional resistance than the first frictional resistance generating mechanism when the paired circular input plates rotate relatively to the paired sub-plates.

When the paired circular input plates rotate, a torque is transmitted through the second elastic member, the sub-plates and the first elastic member to the flange and the hub. When a torsional vibration is transmitted to the paired circular input plates, relative rotation periodically occurs between the respective members.

According to the torsion characteristics, when the torsion angle is small, the first elastic member of a low rigidity is compressed, and the paired circular input plates and the paired sub-plates rotate together and relatively to the hub. In this operation, the first frictional resistance generating mechanism operates such that the coupling member coupled to the paired sub-plates rotate relatively to the flange. The second friction washer rotates together with the coupling member, and the low friction coefficient member of the second friction washer frictionally slides on the plate member of the first friction washer. Thereby, a low hysteresis torque occurs. When the torsion angle increases, the coupling member coupled to the sub-plates is brought into contact with the edge of the first aperture in the first friction washer. Thereafter, the second friction washer rotates together with the coupling member, and thereby the high friction coefficient member of the first friction washer frictionally slides on the side surface of the flange to produce a high hysteresis torque.

When the torsion angle further increases, the sub-plates and the hub rotate together, and the hub rotates relatively to the paired circular input plates. In this operation, the second elastic member is compressed, and the second frictional resistance generating mechanism generates a further higher hysteresis torque than the first frictional resistance generating mechanism.

As described above, a low hysteresis torque is generated for fluctuations in ration of an engine during idling so as to prevent noises from a transmission. When the torsion angle increases due to vibration, a high hysteresis torque is produced at the latter half of the first stage of the torsion characteristics, so that jumping is suppressed.

According to the damper disk assembly of a second aspect, the biasing member is formed of an annular elastic member compressed between one of the sub-plates and the second friction washer.

A damper disk assembly according to a third aspect includes a pair of circular input members, a hub, a pair of sub-plates, a coupling member, a first elastic member, a second elastic member, a first frictional resistance generating mechanism and a second frictional resistance generating mechanism. The paired circular input members have central apertures and are fixed together. The hub has a boss arranged in the central apertures, and a flange provided with a first aperture and arranged between the paired circular input plates. The paired sub-plates are arranged between the paired circular input plates and at the opposite sides of the flange. The coupling member couples the paired sub-plates together, and extend circumferentially movably through the first aperture. The first elastic member circumferentially couples the paired sub-plates to the flange. The second elastic member circumferentially couples the paired circular input plates to the sub-plates. The second elastic member has a higher rigidity than the first elastic member. The first frictional resistance generating mechanism includes first and second friction washers, and an annular elastic member. The first friction washer is made of a high friction coefficient member in contact with a side surface of the flange, and has a second aperture through which the coupling member extends circumferentially movably. The second friction washer has a low friction coefficient member in contact with the first friction washer, and has a third aperture through which the coupling member extends circumferentially movably. The annular elastic member is compressed between the second friction washer and one of the sub-plates, and is coupled relatively nonrotatably to the coupling member. The second frictional resistance generating mechanism generates a larger frictional resistance than the first frictional resistance generating mechanism when the paired circular first members rotate relatively to the paired sub-plates.

When the torsion angle is small, the first elastic member is compressed, and the annular elastic member fixed to the coupling member frictionally slides on the low friction coefficient member to generate a low hysteresis torque. When the torsion angle increases, the coupling member is brought into contact with the circumferential edges of the second and third apertures formed in the first and second friction washers, respectively. Thereafter, the first and second friction washers rotate together with the coupling member. Consequently, the high friction coefficient member of the first friction washer frictionally slides on the side surface of the flange to generate a high hysteresis torque.

As described above, a low hysteresis torque is generated for fluctuations in ration of an engine during idling so as to prevent noises from a transmission. When the torsion angle increases due to vibration, a high hysteresis torque occurs at the latter half of the first stage of the torsion characteristics, so that jumping is suppressed.

According to the damper disk assembly of a fourth aspect, the first and second friction washers are fixed together.

In accordance with yet another aspect of the present invention, a damper disk assembly includes a hub formed with a flange, a pair of sub-plates fixed to one another on opposite sides of the flange being relatively rotatable with respect to the flange, and a pair input plates fixed to one another on opposite sides of the flange and the sub-plates, the input plates begin rotatable relative to the hub and the sub-plates. A first spring is disposed between the sub-plates and the flange limiting relative rotation therebetween. A second spring is disposed between the flange and the input plates limiting relative rotation therebetween, the second spring having a higher level of rigidity than the first spring. A first frictional resistance generating mechanism is disposed between the sub-plates and the flange. A second frictional resistance generating mechanism is disposed between the sub-plates and the input plates. The first spring is compressed in response to relative rotation between the sub-plates and the flange in a first displacement range. The second spring is compressed in response to relative rotation between the flange and the input plates in a second displacement range larger than the first displacement range. The first frictional resistance generating mechanism operates in a first portion of the first displacement range to produce a generally low level of friction and the first frictional resistance generating mechanism operates in a second portion of the first displacement range to produce a generally high level of friction. The second frictional resistance generating mechanism operates in the second displacement range to produce a generally high level of friction.

Preferably, the first frictional resistance generating mechanism includes a first and a second friction washer, the first friction washer formed with surfaces for producing a higher level of friction than the first friction washer.

Preferably, the second friction washer and the sub-plates are fixed to one another by a stop pin for rotation with one another and the first friction washer is formed with an aperture through which the stop pin extends, the aperture sized such that during motion within a portion of the first displacement range, the stop pin is free to move within the aperture.

Preferably, the damper disk assembly further includes a third spring disposed between the flange and the input plates limiting relative rotation therebetween, the third spring having a higher level of rigidity than the first and second springs, the third spring is compressed in response to relative rotation between the flange and the input plates in a portion of the second displacement range.

The foregoing and other objects, features, aspects and advantages of the present invention will become more apparent from the following detailed description, when taken in conjunction with the accompanying drawings.

DESCRIPTION OF THE PREFERRED EMBODIMENTS

Figure 1:
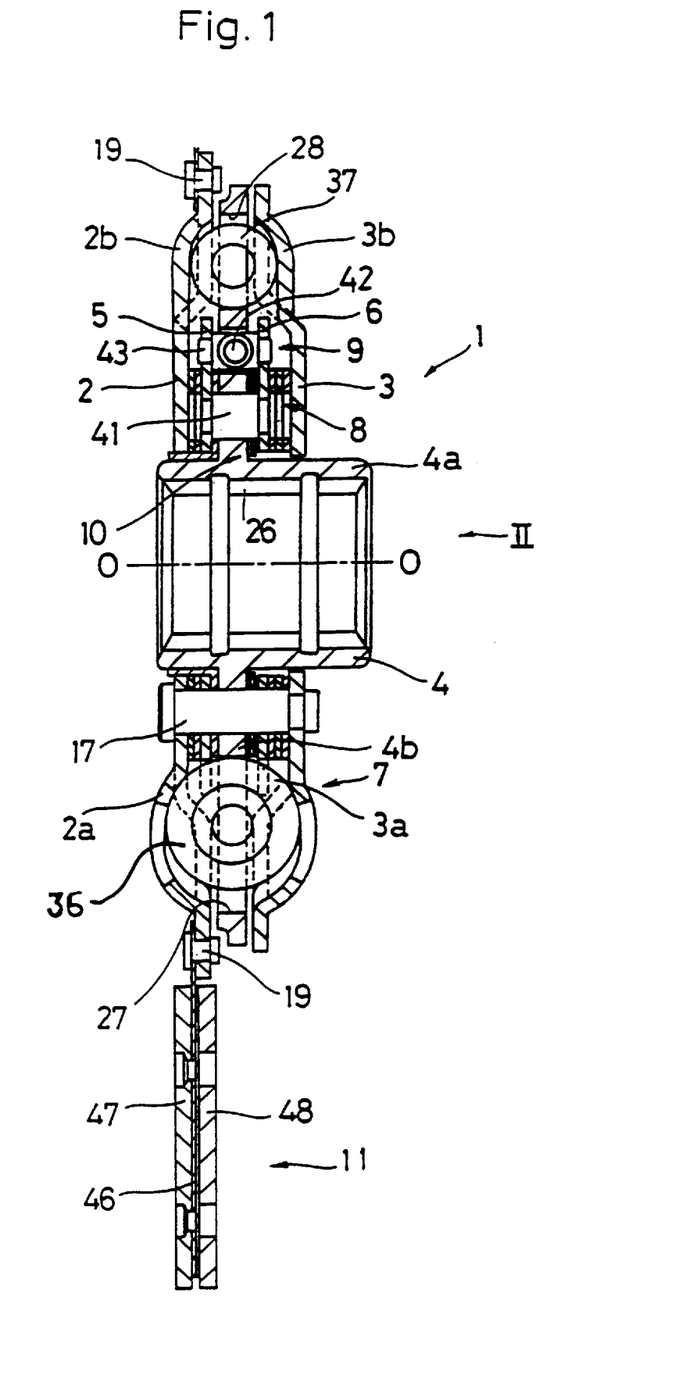
FIG. 1 is a fragmentary, schematic cross section of a clutch disk assembly in accordance with one embodiment of the present invention.
Figure 2:
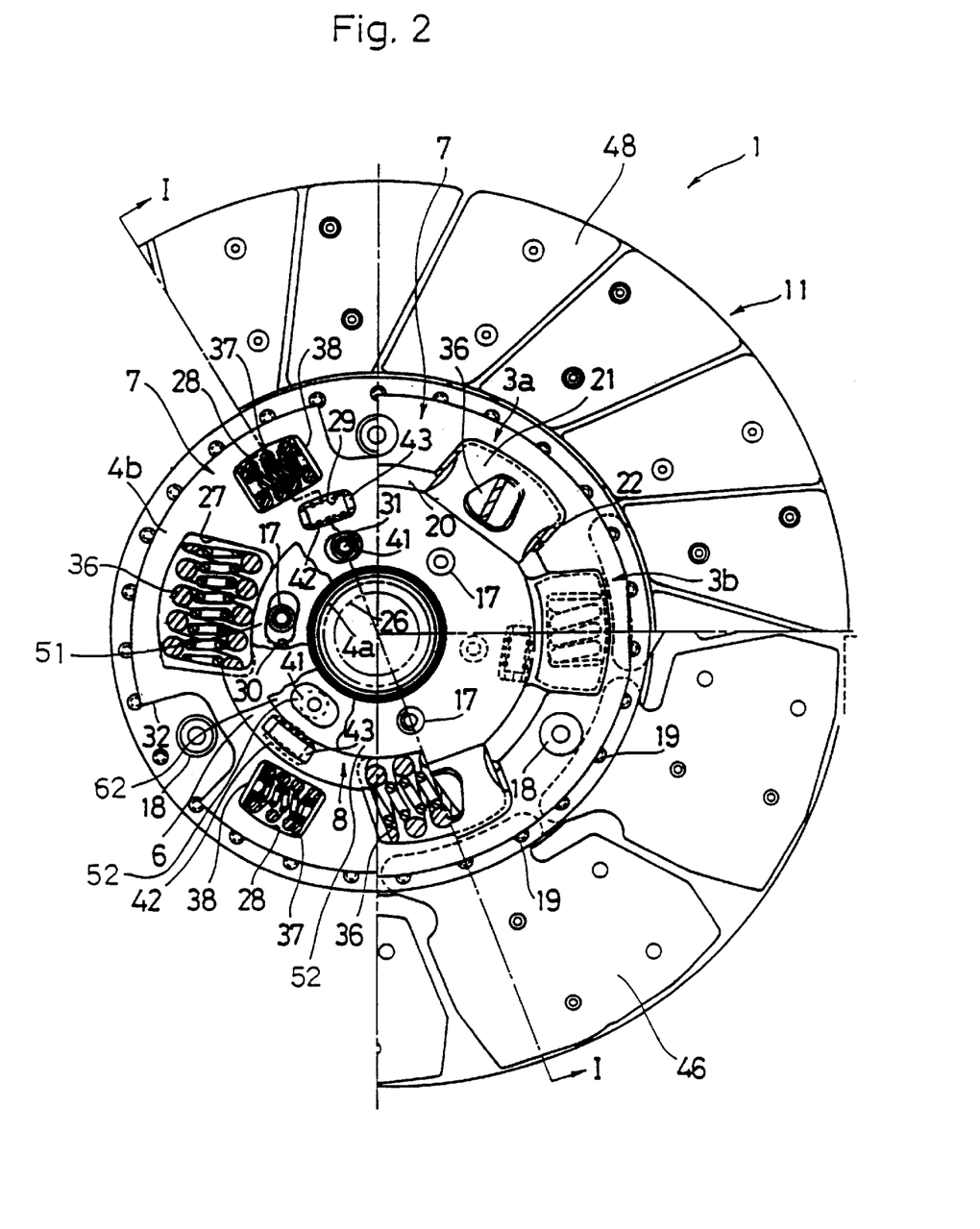
FIG. 2 is a fragmentary, part cross section, part cut-away and part elevational view of the clutch disk assembly depicted in FIG. 1.

FIGS. 1 and 2 show a clutch disk assembly 1 in accordance with one embodiment of the present invention. The clutch disk assembly 1 is an apparatus for transmitting torque from a flywheel (not shown) arranged at a left-hand side in FIG. 1 to a transmission (not shown) arranged at a right-hand side. Line O—O in FIG. 1 represents a rotation axis of the clutch disk assembly 1.

The clutch disk assembly 1 principally includes a pair of input members, i.e., clutch and retaining plates 2 and 3 as well as a spline hub 4, first and second side plates 5 and 6, a first elastic coupling mechanism 9, a first frictional resistance generating mechanism 10, a second elastic coupling mechanism 7, a second frictional resistance generating mechanism 8 and a friction coupling portion 11.

The clutch and retaining plates 2 and 3 have central apertures through which the hub 4 extends. The clutch and retaining plates 2 and 3 are fixed together for integral rotation by three stud pins 17 fixed to inner peripheral portions thereof and three stop pins 18 are fixed to outer peripheral portions thereof as shown in FIGS. 1 and 2.

The plates 2 and 3 are provided with circumferentially equally spaced first windows 2a and 3a as well as second windows 2b and 3b located circumferentially between the first windows 2a and 3a, respectively. The friction coupling portion 11 is fixed to the outer peripheral portion of the clutch plate 2 by a plurality of rivets 19. The friction coupling portion 11 includes a plurality of cushioning plates 46 fixed to the outer peripheral portion of the clutch plate 2 by the rivets 19, and friction facings 47 and 48 fixed to the opposite surfaces of the cushioning plates 46.

The spline hub 4 is formed with a boss 4a and a flange 4b formed integrally at the outer periphery of the boss 4a. The boss 4a is located in the central apertures of the plates 2 and 3. The flange 4b is located between the plates 2 and 3. The boss 4a is provided at its center with a spline aperture 26 which engages an input shaft (not shown) extending from a transmission.

The flange 4b is provided with three first windows 27, which extend circumferentially and correspond to the first windows 2a and 3a in the plates 2 and 3, respectively. The flange 4b is also provided with three second windows 28, which correspond to the second windows 2b and 3b in the plates 2 and 3 and are smaller than the first windows 27. The flange 4b is further provided with further smaller third windows 29 located radially inside the second windows 28. The flange 4b is provided at positions radially inside the third windows 29 with long apertures 30 and short apertures 31 (first apertures) through which the stud pins 17 and stop pins 41 (described below) extend, respectively. The flange 4b is provided at its outer peripheral portion with recesses 32 through which the stop pins 18 extend. Predetermined spaces are ensured circumferentially between edges of the recesses 32 and the stop pins 18 so as to allow relative rotation of the plate 2 and 3 with respect to the spline hub 4.

The second elastic coupling mechanism 7 is principally formed of three first coil springs 36 and three second coil springs 37. The first coil springs 36 are accommodated in the first windows 2a and 3a of the plates 2 and 3, and the first windows 27 of the flange 4b. Each first coil spring 36 has circumferentially opposite ends, which are contacted by the edges of the first windows 2a and 3a, but are circumferentially spaced from the edges of the first windows 27 in the flange 4b by predetermined distances. Each second coil spring 37 is smaller than the first coil spring 36, and is accommodated in the second windows 2b and 3b of the plates 2 and 3 as well as the second window 28 of the flange 4b. Seat members 38 arranged at the opposite ends of each second coil spring 37 are carried by the edges of the second window 28 of the flange 4b, but are circumferentially spaced from the edges of the second windows 2b and 3b of the plates 2 and 3 by predetermined distances.

The first and second side plates 5 and 6 are circular, and have central apertures. The first side plate 5 is arranged between the clutch plate 2 and the flange 4b, and the boss 4a is fitted into the central aperture thereof. The second side plate 6 is arranged between the retaining plate 3 and the flange 4b, and the boss 4a is fitted into the central aperture thereof. The first and second side plates 5 and 6 are fixed together at their radially inner positions for integral rotation by the three stop pins 41 which are located circumferentially between the stud pins 17. The stud pins 41 extend through the short apertures 31 in the flange 4b, respectively. The outer peripheral portions of the first and second side plates 5 and 6 are in contact the opposite ends of each first coil spring 36 in the absence of relative rotational displacement between the first and second side plates 5 and 6 and the plates 2 and 3 and the flange 4b, as shown in FIG. 2.

The first elastic coupling mechanism 9 is provided for elastically and circumferentially coupling the first and second side plates 5 and 6 to the flange 4, and is formed of three third coil springs 42. The third coil springs 42 are arranged in the third windows 29 of the flange 4b, respectively. Seat members 43 arranged at opposite ends of each third coil spring 42 extend axially to engage with the first and second side plates 5 and 6.

Figure 3:
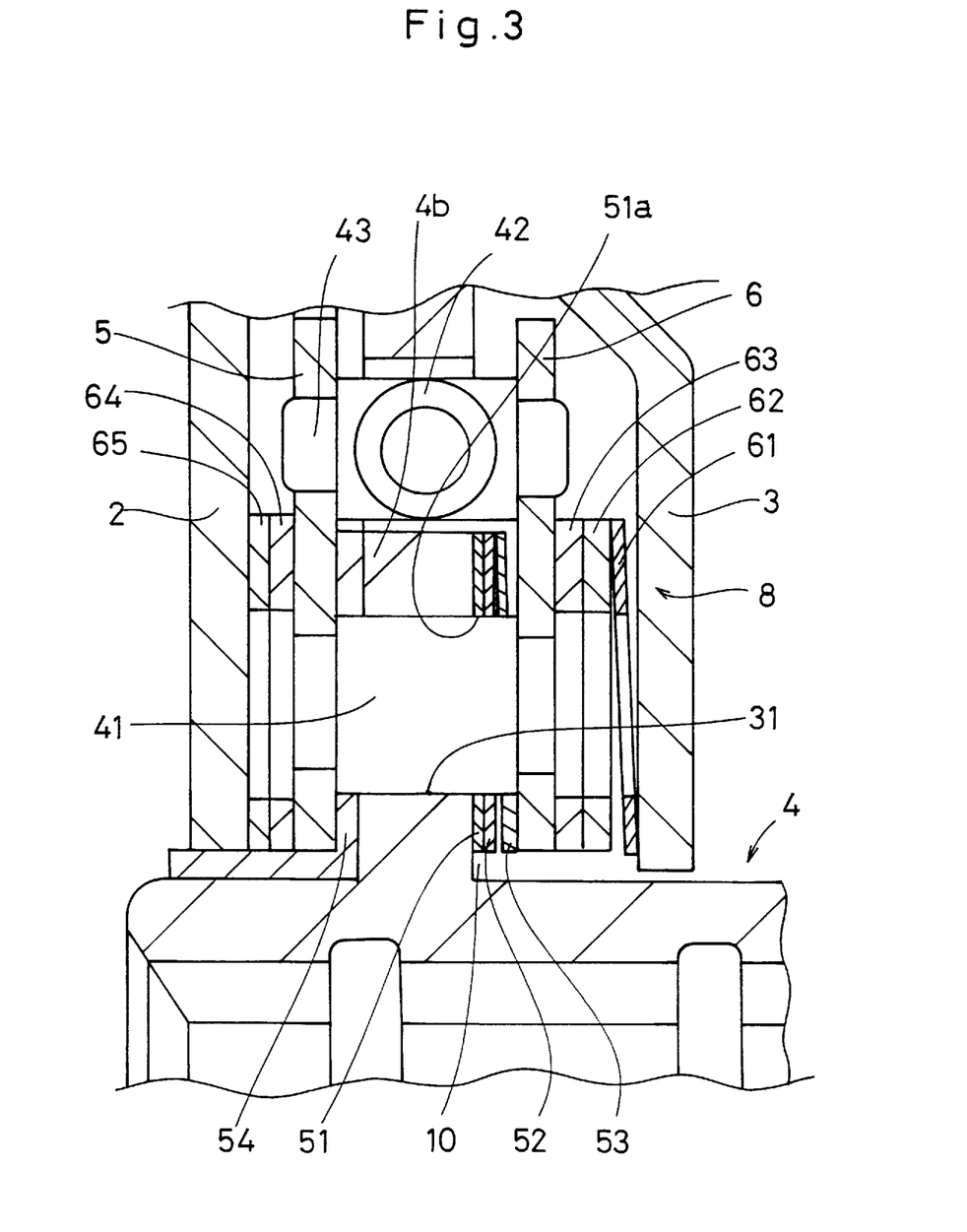
FIG. 3 is a fragmentary cross section of a portion of the clutch disk assembly depicted in FIG. 1, on an enlarged scale.
Figure 4:
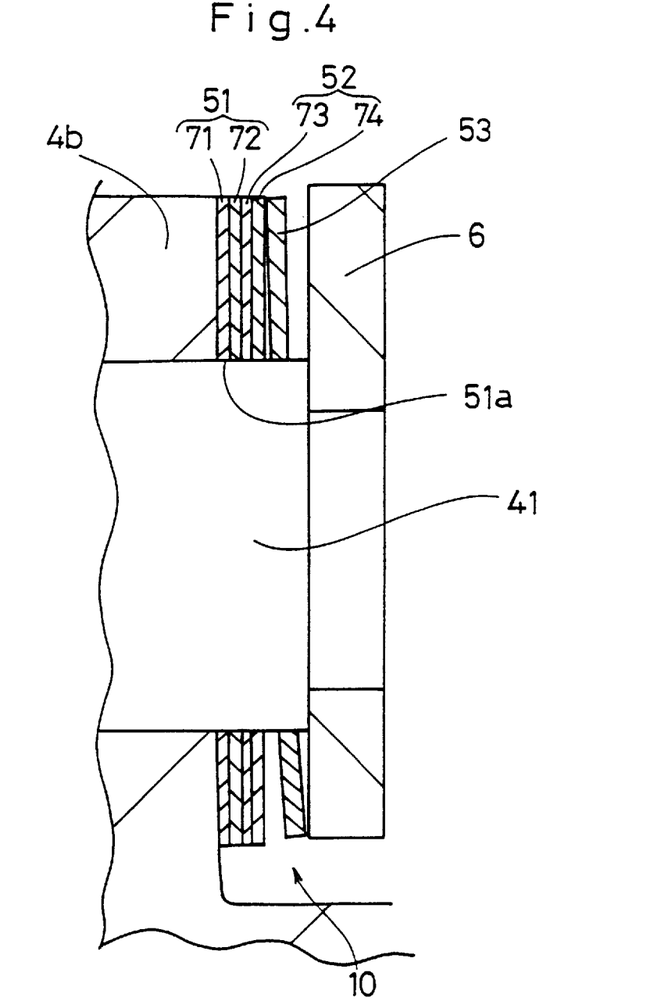
FIG. 4 fragmentary cross section of a portion of the clutch disk assembly depicted in FIGS. 1 and 3, showing portions of a first frictional resistance generating mechanism.

The first frictional resistance generating mechanism 10 is formed of a first friction washer 51, a second friction washer 52 and a conical spring 53, which are arranged between the flange 4b and the second side plate 6, as well as a plate member 54 arranged between the first side plate 5 and the flange 4b. As can be seen from FIG. 3, the first friction washer 51, the second friction washer 52 and the coil spring 53, which are arranged in this order from the side of the flange 4b, are disposed between the flange 4b and the second side plate 6. As shown in FIG. 4, the first friction washer 51 is formed of a high friction coefficient member 71 and a core plate 72 adhered together. The high friction coefficient member 71 is in contact with the flange 4b. The second friction washer 52 is formed of a low friction coefficient member 73 and a core plate 74 adhered together. The low friction coefficient member 73 is in contact with the core plate 72 of the first friction washer 51. The conical spring 53 has an inner peripheral portion which is in contact with the second side plate 6, and also has an outer peripheral portion which is in contact with the second friction washer 52.

Figure 5:
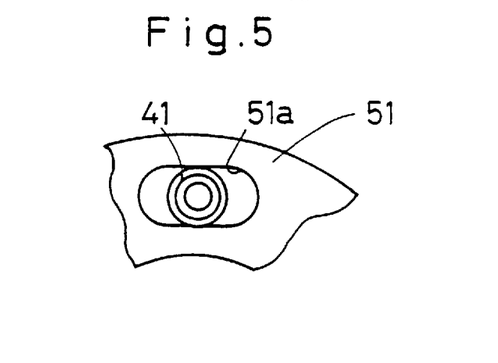
FIG. 5 is a fragmentary elevational view showing a portion of a first friction washer of the first frictional resistance generating mechanism shown in FIG. 4.

The first friction washer 51 has second apertures 51a through which the stop pins 41 extend, as shown in FIG. 5. Each second aperture 51a is circumferentially slightly shorter than the short aperture 31 in the flange 4b. The second friction washer 52 and the conical spring 53 are non-rotatable relatively to the stop pins 41.

The plate member 54 is non-rotatable relatively to the stop pins 41.

The second frictional resistance generating mechanism 8 is formed of a conical spring 61 arranged between the second side plate 6 and the retaining plate 3, plate members 62 and 63, and plate members 64 and 65 arranged between the first side plate 5 and the clutch plate 2. The second frictional resistance generating mechanism 8 can generate a larger frictional resistance, i.e., a higher hysteresis torque than the first frictional resistance generating mechanism 10.

An operation will be described below.

When the friction coupling portion 11 is pressed against the flywheel (not shown), a torque is supplied to the clutch disk assembly 1. This torque is transmitted through the plates 2 and 3, the coil springs 36, 37 and 42, the first and second side plates 5 and 6, the flange 4b and the boss 4a to the input shaft (not shown) extending from the transmission.

When a torsional vibration is transmitted from the flywheel to the clutch disk assembly 1, the plates 2 and 3 periodically rotate relatively to the hub 4. As a result, one set or more of the coil spring 42, 36 or 37 is compressed, and the first and second frictional resistance generating mechanisms 10 and 8 may generate frictional resistances, so that a hysteresis torque occurs and the vibrations are dampened.

When low intensity vibrations are experience by the clutch disk assembly 1, the torsion displacement angle is small. Therefore, the first and second side plates 5 and 6 rotate relatively to the flange 4b, and the coil springs 42 are compressed, so that a low rigidity characteristics are exhibited by the clutch disk assembly 1. In this operation the second friction washer 52 and the conical spring 53 rotate together with the stop pins 41. The first friction washer 51 does not rotate together with the second friction washer 52 because the high friction coefficient member 71 is in contact with the flange 4b. Thus, the low friction coefficient member 73 of the second friction washer 52 frictionally slides on the core plate 72 of the first friction washer 51. As a result, a low hysteresis torque is produced.

Figure 6:
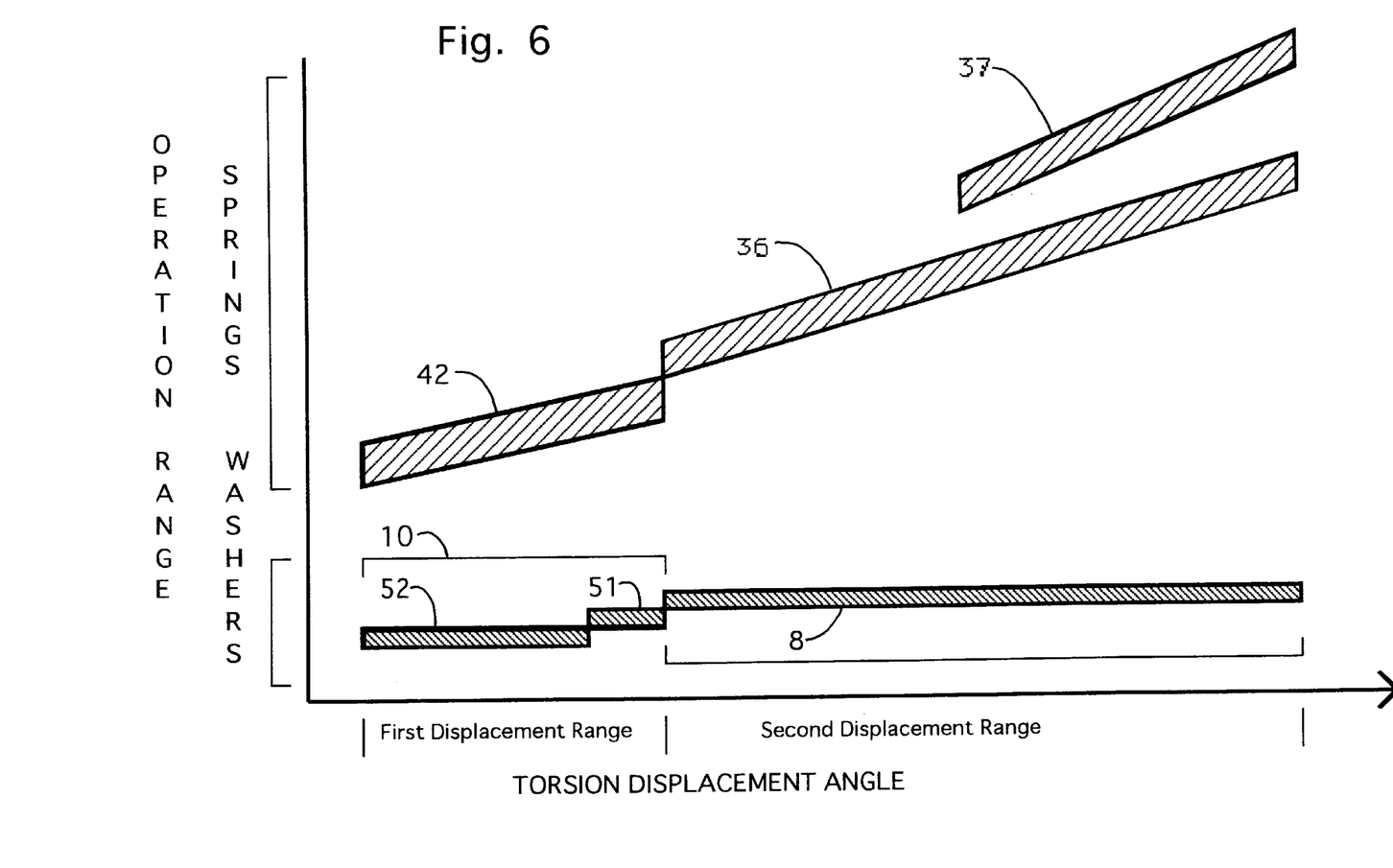
FIG. 6 is a graphical representation of the operating ranges of the first and second frictional resistance generating mechanisms and springs within the clutch disk assembly depicted in FIGS. 1–5.

When higher intensity vibrations are experience by the clutch disk assembly 1, the torsion displacement angle will likely be large. When the torsion displacement angle is large, the stop pins 41 are brought into contact with the circumferential edges of the second apertures 51a of the first friction washer 51, respectively. Thereafter, the first friction washer 51 rotates together with the stop pins 41, and the high friction coefficient member 71 of the first friction washer 51 frictionally slides on the flange 4b. As a result, a high hysteresis torque is produced. The above responses occur in a first displacement range, shown in FIG. 6, where generally only the coil spring 42 is compressed.

Further relative rotation will result in the stop pins 41 being brought into contact with the circumferential edges of the short apertures 31 of the flange 4b. Upon engagement of the stop pins 41 with the edges of the short apertures 31 in the flange 4b, a second general displacement range begins. In the second displacement range also shown in FIG. 6, the first and second side plates 5 and 6 do not rotate relatively to the flange 4b. Therefore, the coil springs 36 are circumferentially compressed between the plates 2 and 3 and the flange 4b. When the torsion displacement angle increases further, the coil springs 37 start to compress. In this second displacement range, the characteristics exhibit a high rigidity and the second frictional resistance generating mechanism 8 generates a high hysteresis torque.

In other words, as torque is being transmitted, and vibrations occur, there may be relative displacement between the various portions of the clutch disk assembly 1. For instance, torque is transmitted from the plates 2 and 3, through the coil springs 36 and 37 to the side plates 5 and 6, then through the springs 42 and then to the flange 4b. When small levels of vibrations occur, because the coil spring 42 are not as stiff as either the springs 36 or 37, the coil springs 42 are compressed within the first displacement range of relative displacement between the side plates 5 and 6 and the flange 4b. The stop pins 41 are fixed to the side plates 5 and 6 and the second friction washer 52 is fixed to the stop pins 41. Therefore, as the coil spring 42 is compressed, the second friction washer 52 produces friction due to engagement with the first friction washer 51. However, the second apertures 51a, through which the stop pins 41 extend, do not have an arcuate length large enough to accommodate the compression of the coil spring 42 in the first displacement range. As is shown operationally in FIG. 6, prior to the coil spring 42 being fully compressed, the stop pins 41 cause the first friction washer 51 to rotate with respect to the flange 4b thus producing friction with respect thereto.

In a second displacement range, the coil springs 36 and 37 are compressed while the second frictional resistance generating mechanism 8 produces a high level of hysteresis torque to assist in dampening higher levels of vibration.

The timing of the first friction washer 51 beginning to create hysteresis torque is determined by the circumferential length of the second apertures 51a and their engagement with the stop pins 41. It should be appreciated that the diameter of the stop pins 41 and/or the length of the second apertures 51a may be manipulated as desired to obtain optimal responses from the clutch disc assembly 1.

When the clutch disk assembly receives a fine torsional vibration due to fluctuations in rotation of the engine during idling, a periodical relative rotation occurs principally through a first displacement angle range, where only the first spring, coil spring 42, is compressed. In order to absorb the torsional vibration during idling, it is preferably that the characteristics exhibit a low rigidity and a low hysteresis torque. The clutch disk assembly 1 also includes high hysteresis torque characteristics such that in a large torsion angle displacement range, the high friction coefficient member 71 of the first friction washer 51 frictionally slides on the flange 4b to generate a high hysteresis torque as described above, so that jumping and/or jerking is minimized.

Alternate Embodiment

Although the first and second friction washers employ the core plates in the embodiment described above, respectively, these core plates may be eliminated. In this case, third apertures corresponding to the apertures in the first friction washer are formed in the second friction washer. Thereby, the low hysteresis torque in the first stage is produced between the outer peripheries of the coil springs and the second friction washer. In FIG. 3, it is assumed that the first and second friction washers 51 and 52 do not have the core members. When the stop pins 41 are brought into contact with the edges of the second apertures 51a of the first friction washer 51 and the third apertures of the second friction washer 52, the first friction washer 51 frictionally slides on the flange 4b to generate a high hysteresis torque. In this case, the first and second friction washers 51 and 52 may be fixed together.

The elastic members employed in the first frictional resistance generating mechanism 10 are not restricted to the conical springs. For example, they may be wavy or corrugated springs or others.

According to the damper disk assembly of the invention, a low hysteresis torque is generated to prevent noises in the transmission, which may be caused by fluctuations in rotation of the engine during idling. When the torsion angle increases due to vibration, a high hysteresis torque is generated at the latter half of the first stage of the torsion characteristics, so that jumping is suppressed.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A damper disk assembly comprising:

a pair of circular input plates having central apertures and fixed together;

a hub having a boss arranged in said central apertures, and a flange provided with a first aperture and arranged between said paired circular input plates;

paired sub-plates arranged between said paired circular input plates and at opposite sides of said flange;

a coupling member coupling said paired sub-plates together, and circumferentially movably extending through said first aperture;

a first elastic member circumferentially coupling said paired sub-plates to said flange;

a second elastic member circumferentially coupling said paired circular input plates to said sub-plates, and having a higher rigidity than said first elastic member;

a first frictional resistance generating mechanism including a first friction washer, a second friction washer and a biasing member, said first friction washer having a high friction coefficient member in contact with a side surface of said flange and a plate member fixed to said high friction coefficient member, and having a second aperture through which said coupling member circumferentially movably extends, said second friction washer having a low friction coefficient member in contact with said plate member, and being relatively nonrotatably coupled to said coupling member, and said biasing member biasing said first and second friction washers toward said flange; and a second frictional resistance generating mechanism for generating a larger frictional resistance than said first frictional resistance generating mechanism when said paired circular input plates rotate relatively to said paired sub-plates.

2. The damper disk assembly according to claim 1, wherein said biasing member is formed of an annular elastic member compressed between one of said sub-plates and said second friction washer.

3. A damper disk assembly comprising:

a pair of circular input plates having central apertures and fixed together;

a hub having a boss arranged in said central apertures, and a flange provided with a first aperture and arranged between said paired circular input plates;

paired sub-plates arranged between said paired circular input plates and at opposite sides of said flange;

a coupling member coupling said paired sub-plates together, and circumferentially movably extending through said first aperture;

a first elastic member circumferentially coupling said paired sub-plates to said flange;

a second elastic member circumferentially coupling said paired circular input plates to said sub-plates, and having a higher rigidity than said first elastic member;

a first frictional resistance generating mechanism including a first friction washer, a second friction washer and an annular elastic member, said first friction washer formed of a high friction coefficient member in contact with a side surface of said flange, and having a second aperture through which said coupling member circumferentially movably extends, said second friction washer having a low friction coefficient member in contact with said first friction washer, and having a third aperture through which said coupling member extends circumferentially movably, and said annular elastic member being compressed between said second friction washer and one of said sub-plates, and being coupled relatively nonrotatably to said coupling member; and a second frictional resistance generating mechanism for generating a larger frictional resistance than said first frictional resistance generating mechanism when said paired circular first members rotate relatively to said paired sub-plates.

4. A damper disk assembly according to claim 3, wherein said first and second friction washers are fixed together.

5. A damper disk assembly, comprising:

a hub formed with a flange;

a pair of sub-plates fixed to one another on opposite sides of said flange being relatively rotatable with respect to said flange;

a pair input plates fixed to one another on opposite sides of said flange and said sub-plates, said input plates begin rotatable relative to said hub and said sub-plates;

a first spring disposed between said sub-plates and said flange limiting relative rotation therebetween;

a second spring disposed between said flange and said input plates limiting relative rotation therebetween, said second spring having a higher level of rigidity than said first spring;

a first frictional resistance generating mechanism disposed between said sub-plates and said flange said first frictional resistance generating mechanism includes a first and a second friction washer, said first friction washer formed with surfaces for producing a higher level of friction than said second friction washer;

a second frictional resistance generating mechanism disposed between said sub-plates and said input plates; and wherein said first spring is compressed in response to relative rotation between said sub-plates and said flange in a first displacement range and said second spring is compressed in response to relative rotation between said flange and said input plates in a second displacement range larger than said first displacement range;

wherein said first frictional resistance generating mechanism operates in a first portion of said first displacement range to produce a generally low level of friction and said first frictional resistance generating mechanism operates in a second portion of said first displacement range to produce a generally high level of friction;

wherein said second frictional resistance generating mechanism operates in said second displacement range to produce a generally high level of friction;

wherein said second friction washer and said sub-plates are fixed to one another by a stop pin for rotation with one another and said first friction washer is formed with an aperture through which said stop pin extends, said aperture sized such that during motion within a portion of said first displacement range, said stop pin is free to move within said aperture.

6. The damper disk assembly as set forth in claim 5, further comprising a third spring disposed between said flange and said input plates limiting relative rotation therebetween, said third spring having a higher level of rigidity than said first and second springs, said third spring is compressed in response to relative rotation between said flange and said input plates in a portion of said second displacement range.

* * * * *